United States Patent
Phelps et al.

(10) Patent No.: US 11,732,474 B1
(45) Date of Patent: Aug. 22, 2023

(54) MODULAR WALL AND FAÇADE SYSTEMS FOR DISTRIBUTING ENERGY OR SIGNALS IN STRUCTURES

(71) Applicant: Energy Facade Systems LLC, Chicago, IL (US)

(72) Inventors: Joel Phelps, Chesterton, IN (US); Rodrigo d'Escoto, Chicago, IL (US)

(73) Assignee: ENERGY FACADE SYSTEMS LLC, Chicago, IL (US)

( * ) Notice: Subject to any disclaimer, the term of this patent is extended or adjusted under 35 U.S.C. 154(b) by 0 days.

(21) Appl. No.: 18/105,753

(22) Filed: Feb. 3, 2023

(51) Int. Cl.
| | |
|---|---|
| *E04B 2/96* | (2006.01) |
| *E06B 9/24* | (2006.01) |
| *H02S 20/26* | (2014.01) |
| *G02F 1/153* | (2006.01) |
| *G02F 1/1333* | (2006.01) |
| *H02S 30/10* | (2014.01) |
| *E04B 2/88* | (2006.01) |

(52) U.S. Cl.
CPC ............... *E04B 2/967* (2013.01); *E04B 2/88* (2013.01); *E04B 2/96* (2013.01); *E06B 9/24* (2013.01); *G02F 1/133308* (2013.01); *G02F 1/153* (2013.01); *H02S 20/26* (2014.12); *H02S 30/10* (2014.12); *E06B 2009/2464* (2013.01)

(58) Field of Classification Search
CPC ... E04B 2/88; E04B 2/96; E04B 2/967; E06B 9/24; G02F 1/153; G02F 1/133308; H02S 20/26; H02S 30/10
See application file for complete search history.

(56) References Cited

U.S. PATENT DOCUMENTS

| | | | | |
|---|---|---|---|---|
| 4,003,619 A | * | 1/1977 | Smith | H01R 31/085 |
| | | | | 439/510 |
| 5,381,637 A | * | 1/1995 | Farag | E06B 3/5427 |
| | | | | 52/204.593 |
| 5,579,616 A | * | 12/1996 | Farag | E04B 2/96 |
| | | | | 52/311.1 |
| 7,987,644 B2 | | 8/2011 | Walker, III et al. | |
| 11,396,750 B2 | | 7/2022 | White et al. | |
| 2008/0163918 A1 | * | 7/2008 | Li | H01L 31/0508 |
| | | | | 136/244 |

(Continued)

FOREIGN PATENT DOCUMENTS

| | | | | |
|---|---|---|---|---|
| CN | 201059027 Y | * | 5/2008 | |
| CN | 209104170 U | * | 7/2019 | ....... H01L 31/02008 |

(Continued)

*Primary Examiner* — Jessie T Fonseca
(74) *Attorney, Agent, or Firm* — Perkins Coie LLP (57) ABSTRACT

A wall system for a building (such as an exterior façade for a building) may include a frame structure configured for attachment to the building. The frame structure may include a plurality of horizontal frame elements, a plurality of vertical frame elements, and an energy distribution system including an elongated conductive bar at least partially positionable within at least one of the horizontal frame elements or at least one of the vertical frame elements. The system may include one or more access elements positionable to engage the elongated conductive bar to receive electricity or a data signal from the elongated conductive bar. The frame structure may support infills that connect to the elongated conductive bar and use or produce electricity.

18 Claims, 6 Drawing Sheets

(56) References Cited

U.S. PATENT DOCUMENTS

| | | | |
|---|---|---|---|
| 2010/0071282 A1* | 3/2010 | Tofflemire | E04B 2/967 52/173.3 |
| 2010/0071748 A1* | 3/2010 | Brescia | E04B 2/96 52/235 |
| 2017/0040929 A1* | 2/2017 | Ting | F24S 25/37 |
| 2017/0040940 A1* | 2/2017 | Ting | E04B 2/965 |
| 2017/0070185 A1* | 3/2017 | Ting | E06B 1/00 |
| 2017/0298621 A1* | 10/2017 | Frederick | E04B 2/967 |
| 2019/0078380 A1* | 3/2019 | McKenna | E04B 2/96 |
| 2019/0264491 A1* | 8/2019 | McKenna | E06B 3/26 |
| 2022/0337188 A1* | 10/2022 | Saleem | H01L 31/049 |

FOREIGN PATENT DOCUMENTS

| | | | | |
|---|---|---|---|---|
| CN | 111827533 A | * | 10/2020 | E04B 2/88 |
| DE | 202005000582 U1 | * | 6/2006 | B60R 16/0215 |
| EP | 0475417 A2 | * | 3/1992 | |
| JP | 2014136919 A | * | 7/2014 | |
| KR | 20090030134 A | * | 3/2009 | |
| KR | 101063208 B1 | * | 9/2011 | |
| KR | 20200005766 A | * | 1/2020 | |
| WO | WO-2010039541 A1 | * | 4/2010 | E04B 2/88 |
| WO | WO-2011152311 A1 | * | 12/2011 | H02S 30/10 |
| WO | WO-2018152249 A1 | * | 8/2018 | E06B 9/24 |

* cited by examiner

MODULAR WALL AND FAÇADE SYSTEMS FOR DISTRIBUTING ENERGY OR SIGNALS IN STRUCTURES

BACKGROUND

Many conventional buildings, such as high-rises or other buildings, include internal structures that support an externally facing outer wall, which is commonly called a façade. Conventional façades may include window wall systems, curtain wall systems, hybrid wall systems, or other wall systems. Conventional façade/wall systems include one or more frames made from a metal or vinyl material. The frames support a glass or opaque infill that is attached by a process commonly called "glazing."

Some conventional infills may include electrochromic glass units that use energy to change a characteristic of themselves (e.g., tint themselves), or photovoltaic panels that convert sunlight to energy. Accordingly, some infills may require electrical connections to transport electricity between the façade system and another building structure or system. Such infills use bundles of delicate wiring and cables extending within the frames. Disadvantageously, the bundles of delicate wiring typically cost more than the infill device itself. And servicing or replacing such infills typically requires removing the wires from the frames and then trying to route new replacement wires through the small space inside the frame, which is often difficult or impossible without cutting the frames open and then patching them closed. Accordingly, although infills that generate electricity or have electrochromic functions are desirable (e.g., for reducing a building's net energy usage and increasing a building's energy efficiency), they are often prohibitively difficult or costly to install and maintain, and, as a result, have not been widely adopted.

Aspects of embodiments of the present technology address these issues and other issues and shortcomings in conventional technology.

SUMMARY

Representative embodiments of the present technology include a wall system for a building (such as an exterior façade for a building). The wall system may include a frame structure configured for attachment to the building. The frame structure may include a plurality of horizontal frame elements, a plurality of vertical frame elements, and an energy distribution system including an elongated conductive bar at least partially positionable within at least one of the horizontal frame elements or at least one of the vertical frame elements. The system may include one or more access elements positionable to engage the elongated conductive bar to receive or deliver electricity or a data signal to or from the elongated conductive bar. The frame structure may support infills that connect to the elongated conductive bar and that use or produce electricity, such as photovoltaic panels, electrochromic panels, displays, and so forth.

Other features, embodiments, and advantages will appear hereinafter. The features described herein can be used separately or together, or in various combinations of one or more of them.

BRIEF DESCRIPTION OF THE DRAWINGS

In the drawings, wherein the same reference number indicates the same element throughout the several views.

DETAILED DESCRIPTION

The present technology is directed to wall and façade systems that distribute energy (e.g., electricity or data signals) in structures, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions may not be shown or described in detail to avoid unnecessarily obscuring the relevant description of the various embodiments. Accordingly, embodiments of the present technology may include additional elements or exclude some of the elements described below with reference to FIGS. 1-6, which illustrate examples of the technology.

The terminology used in this description is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Embodiments of the present technology include, but are not limited to, façade/wall systems (hereinafter referred to as "wall systems" for convenience only) that may be anchored to a primary structure, such as a building floor or slab, or to a secondary structure (e.g., a metal or wood frame or another suitable portion or structure associated with a building). The wall systems include electricity or data distribution capabilities (or both electricity and data distribution capabilities) via elongated (e.g., extruded) conductive lines (e.g., bars) that extend within and through the frames of the wall systems. Embodiments of the present technology facilitate "tapping in" to the conductive lines for any suitable use of the electricity or data provided by the conductive lines.

For example, embodiments of the present technology facilitate use, simplified maintenance, and simplified replacement of various infills, including infills that include photovoltaic systems, electrochromic systems, screens, displays, sensors, health monitors, or other technologies suitable for implementation into or onto a wall system. Because the present technology improves the usability and implementation of photovoltaic and electrochromic systems, embodiments of the present technology facilitate reducing a building's energy usage and carbon footprint (e.g., by harnessing solar energy or tinting windows to reflect heat).

In addition, the frames themselves can provide access points to electricity or data signals for a user inside or outside the building via the conductive lines passing therethrough, as described in additional detail below. Embodiments of the present technology allow wall systems to have numerous modular designs using various infills with different functions. For example, wall systems configured in accordance with embodiments of the present technology may include or support infills that (a) may or may not use or provide electricity or data; (b) may be easily replaced, upgraded, maintained, and so forth, from within the interior space of a building; (c) may be installed, maintained, or replaced without working from outside of the building (and without requiring a worker to be suspended on the outside of the building) during the installation, maintenance, or replacement process; (d) may eliminate a need for long lengths of wire and complex splicing procedures during installation, maintenance, or replacement processes; or (e) facilitate delivery of electricity or data at any suitable location, in contrast to conventional wiring structures which can only provide electricity or data at the terminal ends of the traditional wiring structures.

Figure 1:
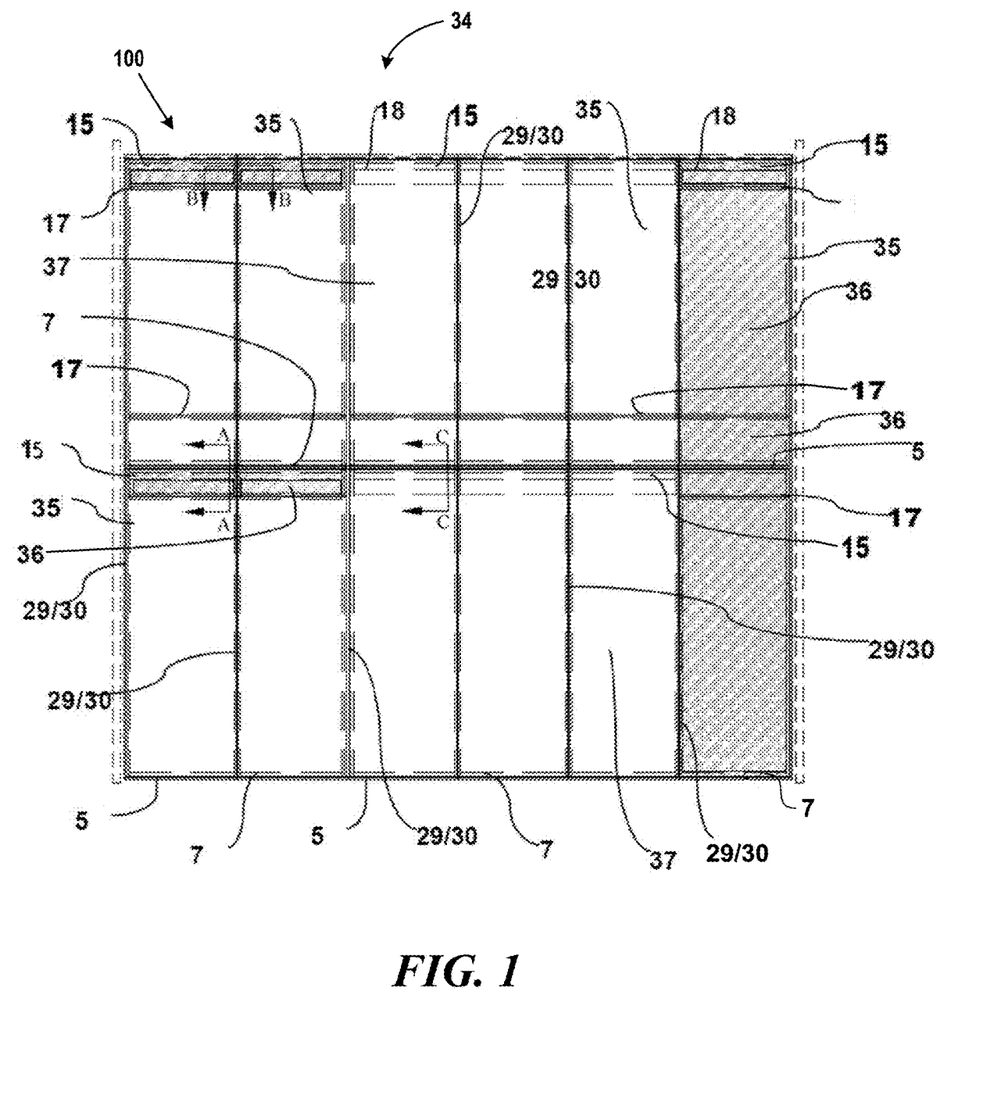
FIG. 1 illustrates a partially schematic elevation view of a wall system configured in accordance with embodiments of the present technology.

FIG. 1 illustrates a partially schematic elevation view of a wall system 34 configured in accordance with embodiments of the present technology. In some embodiments, the wall system 34 may include a frame structure 100 that may be attached to a building by any suitable attachment systems, devices, or methods, including attachment systems, devices, or methods known in the art for attaching a façade structure to a building (e.g., a curtain wall, window wall, and so forth.). A representative suitable attachment to a building slab is shown and described in additional detail below with regard to FIG. 2.

In some embodiments, the frame structure 100 may include one or more first vertical frame element portions 29 and one or more second vertical frame element portions 30. In some embodiments, adjacent vertical frame element portions 29, 30 may be attached to, connected to, or integral with each other, forming a single vertical frame element. For example, the first vertical frame element portions 29 may be releasably or permanently connectable to adjacent second vertical frame element portions 30 to collectively form vertical frame elements/vertical portions of the frame structure 100.

The frame structure 100 may further include one or more first horizontal frame elements 15, one or more second horizontal frame elements 17, and one or more third horizontal frame elements 7 forming horizontal portions of the frame structure 100 that are secured to the first and second vertical frame element portions 29, 30.

The frame structure 100 may support one or more infill panels (hereinafter "infills"). For example, in some embodiments, one or more first infills 36 may include one or more translucent, semitranslucent, electrochromic, photovoltaic, or other types of panels. In some embodiments, one or more second infills 37 may include one or more clear glass, acrylic, or other panels. The infills 36, 37 may comprise any type, quantity, arrangement, pattern, or other aspect suitable for being supported in a frame structure, such as the frame structure 100, to form a building façade. In representative embodiments of the present technology, one or more of the infills 36, 37 include aspects or features that require or generate electricity or have data transmission features, such as photovoltaic panels, electrochromic panels, sensors, and so forth. The infills 36, 37 may be structurally glazed onto or into the frame structure 100. In some embodiments, one or more infills 36, 37 may include an inwardly or outwardly facing display (or the wall system 34 may power an inwardly or outwardly facing display) for providing a space-saving or space-efficient display similar to a television or monitor.

In some embodiments, some or all of the infills 36, 37 may be oriented vertically, or some or all of the infills 36, 37 may be oriented horizontally. The infills 36, 37 may be any suitable size or shape. In some embodiments, the edges of the infills 36, 37 may include seals 5 to close gaps, to facilitate expansion and contraction, or to insulate the interior of the building from precipitation, wind, temperature, or other aspects of the building's external environment. Any suitable number of infills 36, 37 and frame elements 7, 15, 17, 29, 30 may be joined together as needed or desired for forming a wall system 34.

A complete façade may include any suitable number of wall systems 34 forming a single overall wall system 34 that includes the energy or data network described herein. In some embodiments, a section of the wall system 34 may be a panel assembly 35. The panel assembly 35 may include a frame section that includes two vertical frame element portions 29, 30, each forming opposing sides of the frame section, and two horizontal frame elements (7, 15, or 17) forming opposing sides of the frame section and oriented transverse or perpendicular to the vertical frame element portions 29, 30. The wall system 34 may include a number of such panel assemblies 35 assembled at a remote location and brought together (e.g., interconnected) onsite to form the wall system 34, with the conductive connections described below to provide electricity or data throughout some or all of the wall system 34. In some embodiments, each panel assembly 35 may include an infill, although an infill is not required.

Figure 2:
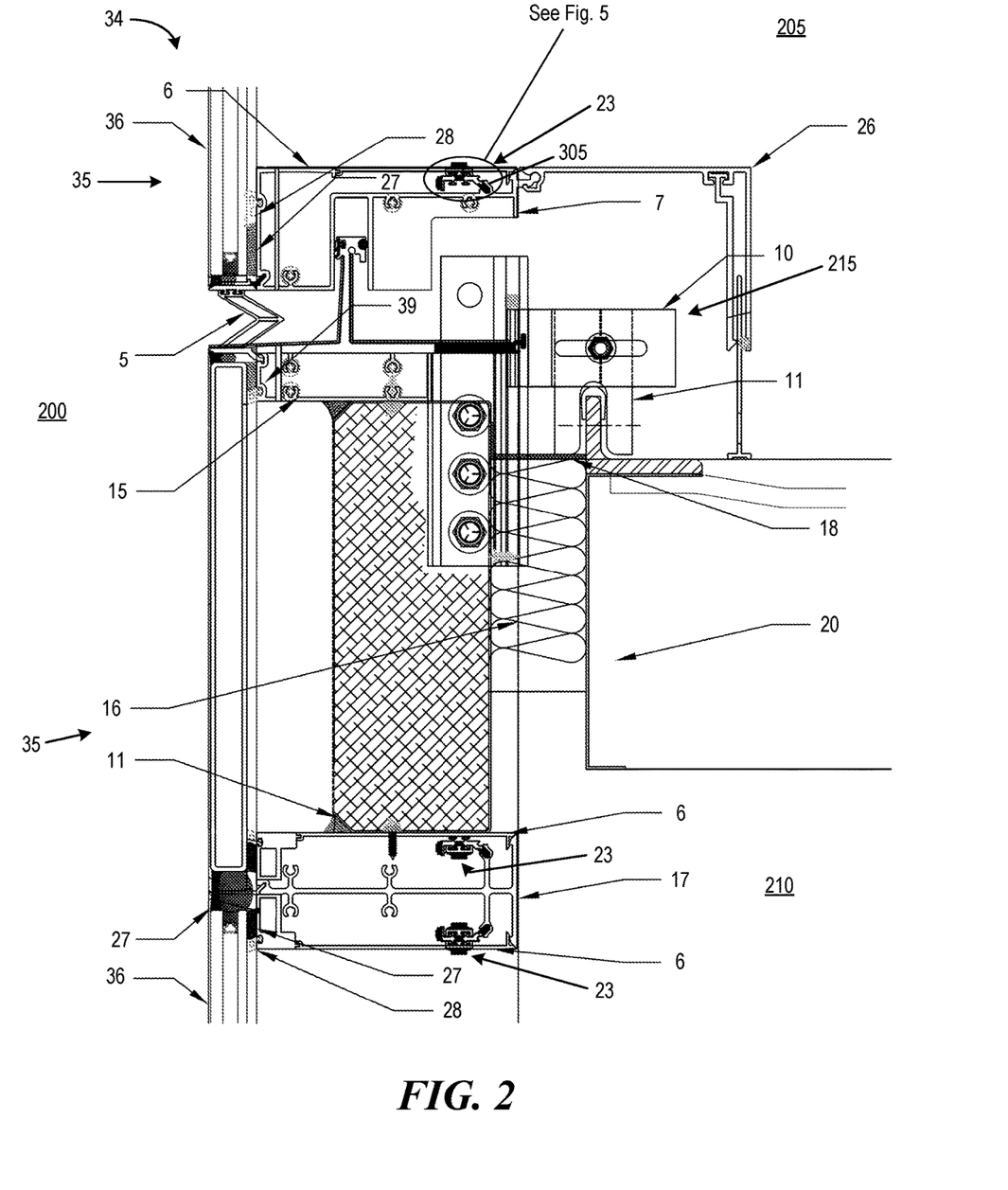
FIG. 2 illustrates a partially schematic cross-sectional view of at least a portion of the wall system shown in FIG. 1 and configured in accordance with embodiments of the present technology.

FIG. 2 illustrates a partially schematic cross-sectional view of at least a portion of the wall system 34 shown in FIG. 1 and configured in accordance with embodiments of the present technology. The view in FIG. 2 is of a perspective looking horizontally into the cross-section, such that in an implementation of the wall system 34 in a building, the exterior region is located in area 200, and the interior habitable region of the building is located in areas 205 and 210. Slab 20 is a floor of the building, such that areas 205, 210 are different habitable floor areas (area 205 being an upper floor area above area 210). Although a slab 20 is illustrated and described as an anchor point for embodiments of the present technology, the slab 20 is for example only, and the present technology may be implemented in any suitable portion of a building structure, such as a secondary structure. Two infills 36 are shown, although any type and number of infills may be implemented, as explained above.

In some embodiments, the wall system 34 (or a portion thereof, such as one or more panel assemblies 35) is attached to a terminal end of the slab 20, or another location. For example, the wall system 34 or a portion thereof may be attached to the slab 20 via a suitable anchor assembly 215. Also visible in FIG. 2 are some of the horizontal members 7, 15, 17 (in cross-section). Another suitable anchor assembly that may be implemented in embodiments of the present technology is described in U.S. Pat. No. 11,396,750, which is incorporated herein by reference.

In some embodiments, the wall system 34 includes an energy distribution system, at least a portion of which is indicated as element 23 in FIG. 2. The energy distribution system 23 may include elongated conductive lines (e.g., extruded bars, which are described in additional detail below with regard to FIG. 5) extending within the horizontal frame elements 7, 15, 17 to carry electricity or signal through the horizontal frame elements 7, 15, 17.

In some embodiments, the wall system 34 may include one or more interior trim assemblies 26 for closing off or covering portions of the anchor assembly 215 relative to the area 205. In some embodiments, the wall system 34 may include fire resistance, weatherproofing, and other measures such as slab-edge fire-safing insulation 16, one or more smoke seals 18 (shown in FIG. 1), one or more gaskets 28, one or more additional seals 27 (see FIG. 4, described below), a back pan 11 (which may be sealed to some or all of the frame structure 100 or other components, such as one or more of the panel assemblies 35, to function as a vapor barrier to resist interior condensation in cold temperatures, or to otherwise seal aspects of the structure), one or more spacers 2, or suitable quantities of fasteners.

Figure 3:
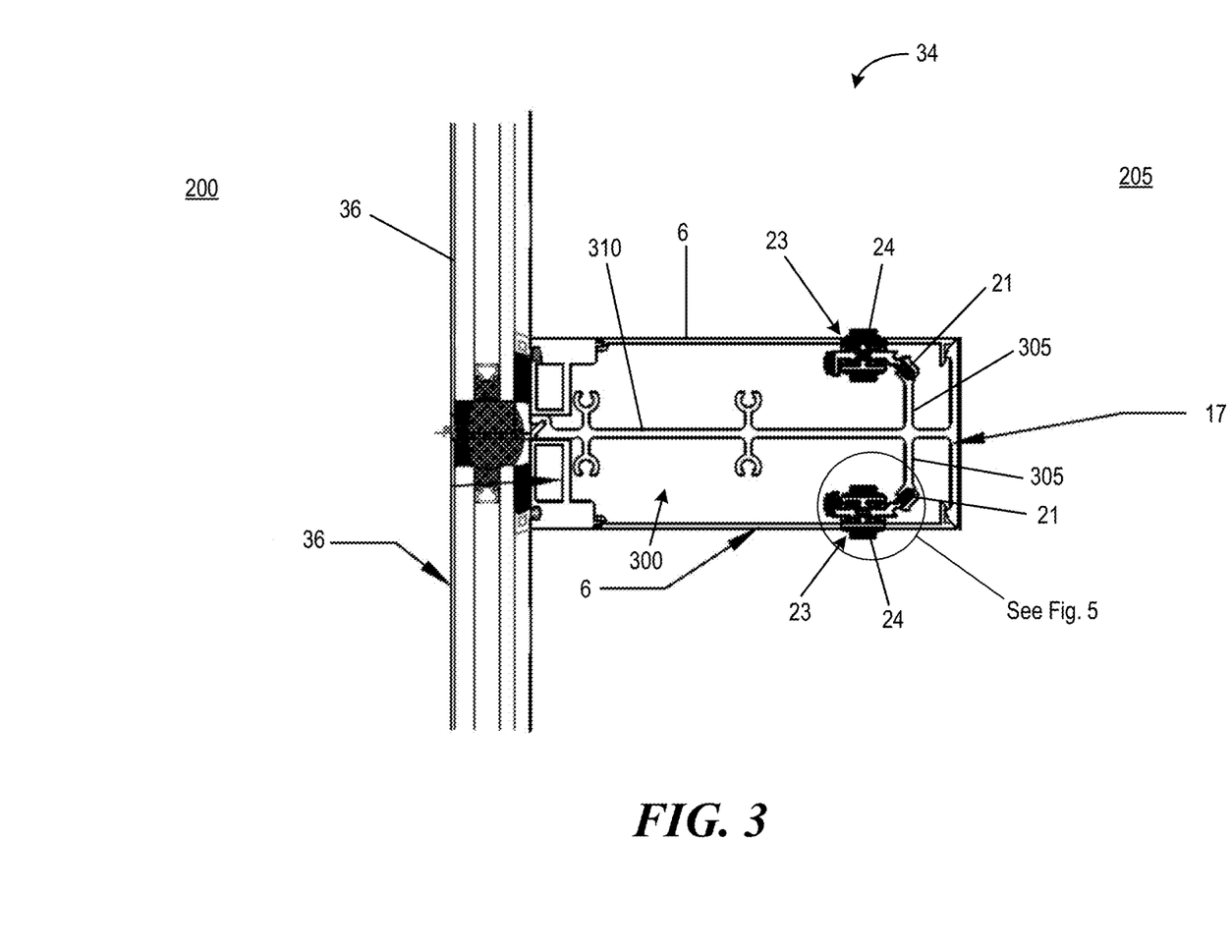
FIG. 3 illustrates a partially schematic cross-sectional view of at least a portion of the wall system shown in FIG. 1 and configured in accordance with embodiments of the present technology.

FIG. 3 illustrates a partially schematic cross-sectional view of at least a portion of the wall system 34 shown in FIG. 1 and at least a portion of the energy distribution system 23, configured in accordance with embodiments of the present technology. The view in FIG. 3 is of a perspective looking horizontally into the cross-section, and it shows a horizontal frame element 17 positioned away from the slab 20 (not visible in FIG. 3) and anchor assembly 215 (not visible in FIG. 3) to simplify the illustration, although it can represent any horizontal frame element in the wall system 34. For example, in FIG. 3, the horizontal frame element 17 may form a windowsill. Also visible in FIG. 3 are two infills 36, although any type and number of infills may be implemented, as explained above.

The energy distribution system 23 extends through and along the horizontal frame element(s) 17. In some embodiments, a horizontal frame element 17 includes a beam body 300 with supports 305 for supporting the energy distribution system 23 away from a central web 310 of the beam body 300. The supports 305 may include extruded elements extending from the central web 310, clips extending from the central web 310, or other suitable mechanisms for supporting the energy distribution system 23. In some embodiments, the supports 305 may include electrically insulative properties or may support electrically insulative components 21. In some embodiments, any of the horizontal frame elements 7, 15, 17 may include suitable supports or mechanisms for supporting portions of the energy distribution system 23 in or on the horizontal frame elements.

In some embodiments, the horizontal frame element 17 may further include cover panels 6 that are attachable (such as by snapping or other fastening methods) onto and off of the beam body 300. The cover panels 6 facilitate access to the energy distribution system 23 by allowing one or more access elements 24, such as connector devices or inductive-contact devices, to extend through the cover panels 6 or other portions of the horizontal frame element 17 (e.g., by suitable openings in the cover panels 6) and attach to the energy distribution system 23. In some embodiments, the cover panels 6 are openable and closeable to facilitate access to an interior region of the horizontal frame element 17.

In general, the wall system 34 may include one or more access elements 24 positionable to extend from a region outside a horizontal frame element 7, 15, 17 and through at least a portion of the horizontal frame element (i.e., into the horizontal frame element) to engage an elongated conductive bar 500 (described below), such that the access element forms one or more access points for electricity or data signals. In some embodiments, one or more access points may include points where data or electricity may be accessed wirelessly (e.g., by induction) or in other suitable ways, which may or may not include contact between the access elements or access points and the elongated conductive bars 40, 500. The cover panels 6 are releasably attachable to the beam body 300 to at least partially cover the one or more supports 300, such that the cover panels 6 and the horizontal frame element 17 form an enclosure in which the energy distribution system 23 can be contained and extend through the wall system 34. A similar structure may be implemented for the other horizontal frame elements 7, 15.

Figure 4:
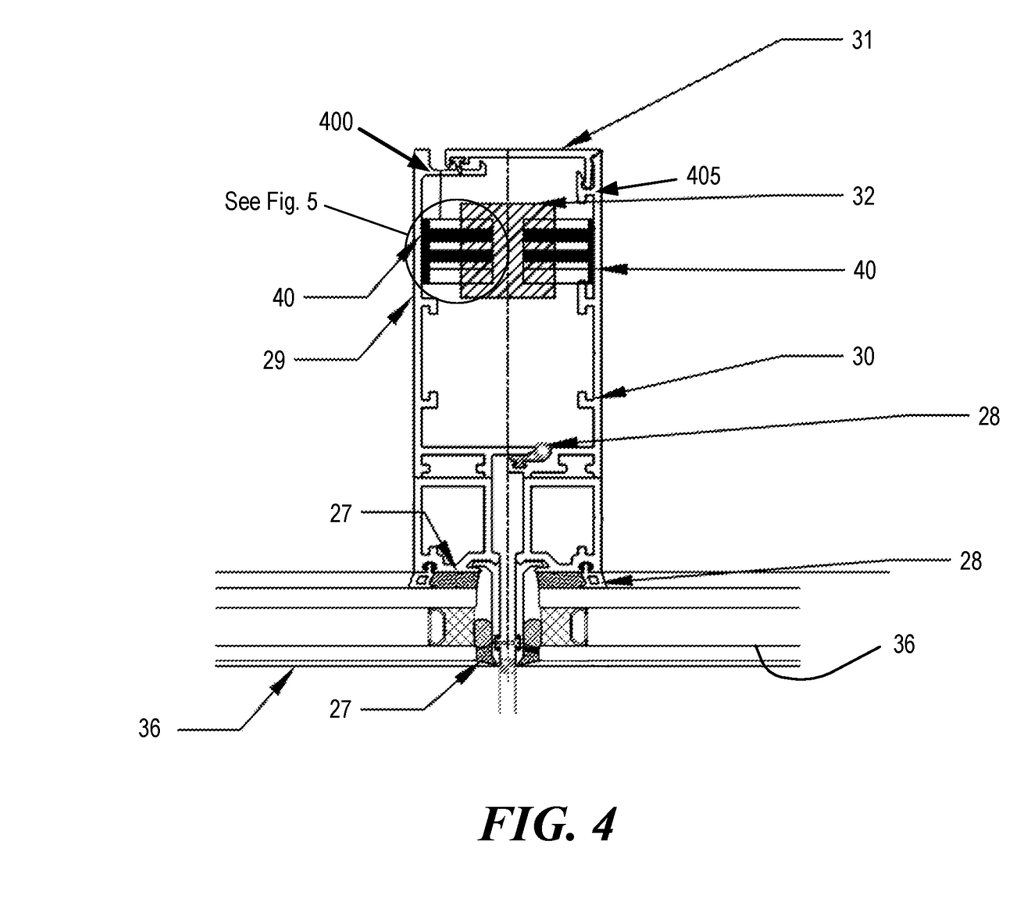
FIG. 4 illustrates a partially schematic cross-sectional view of at least a portion of the wall system shown in FIG. 1 and configured in accordance with embodiments of the present technology.

FIG. 4 illustrates a partially schematic cross-sectional view of at least a portion of the wall system 34 shown in FIG. 1 and configured in accordance with embodiments of the present technology. The view in FIG. 4 is a perspective looking vertically into a cross-section of the vertical frame element portions 29, 30. Also visible in FIG. 4 are two infills 36, although any type and number of infills may be implemented. In some embodiments, the vertical frame element portions 29, 30 are releasably attachable to each other (e.g., male and female half members) to form a mated vertical frame element (e.g., a mullion).

In some embodiments, the first vertical frame element portions 29 may include one or more first mechanical connection devices 400 (e.g., snaps, latches, clip structures, friction connections, etc.), one or more of which may or may not be integral with the first vertical frame element portions 29, or the second vertical frame element portions 30 may include one or more second mechanical connection devices 405 (which may be similar or complementary to the first mechanical connection devices 400), The mated vertical frame element (mullion) may further include an access panel 31 that is releasably attachable to the vertical frame element portions 29, 30 (e.g., via the first mechanical connection devices 400 or the second mechanical connection devices 405). In some embodiments, one or more of the mechanical connection devices may be omitted (e.g., the access panel 31 may be attached to one of the vertical frame element portions 29, 30, while not being connected to (e.g., only being in contact with) the other vertical frame element portion 29, 30. In some embodiments, the access panel 31 is openable and closeable to facilitate access to an interior region of the vertical frame element(s).

Together, the vertical frame element portions 29, 30 and the access panel 31 form a vertical frame element that functions as an enclosure for vertical components of the energy distribution system 23. For example, in some embodiments, the energy distribution system 23 may include vertical elongated conductive lines 40 (which may optionally include extruded bars or extruded lines, and which may be, but need not be, generally similar to the lines described above for the horizontal portions of the energy distribution system 23). Some embodiments may not include vertical elongated conductive lines 40, which are optional depending in part on the configurations of the horizontal elongated conductive lines 500 (e.g., different voltage, current, or signal characteristics).

In some embodiments, the energy distribution system 23 may include one or more continuity patches 32, which may be accessible via removal of the access panel 31, and which may provide a conductive connection between the vertical conductive lines and the horizontal conductive lines of the energy distribution system 23. In some embodiments, the one or more continuity patches 32 may be formed with materials or structures that regulate or maintain voltage or current levels and data-signal integrity. In general, when included, the vertical elongated conductive lines 40 may connect to one or more of the horizontal components of the energy distribution system 23 to form a network of continuity in the wall system 34. In some embodiments, a plurality of networks of continuity may be formed in the same wall system 34 with various connections or combinations of horizontal and vertical elongated conductive lines, each of which may be removable or replaceable via removal of their corresponding access panels or covers.

In some embodiments, one or more of the continuity patches 32 may include one or more sensors or signal devices such as one or more wireless communication devices (e.g., Bluetooth, WiFi, or other suitable wireless or wired signal devices) to sense or provide feedback to a user about usage, status, and other diagnostics associated with the energy distribution system 23 or other aspects of the wall system 34 (e.g., whether components associated with the system are connected, controlling operation of one or more components such as turning on or off continuity, performance measurements, and so forth). In some embodiments, diagnostics or control may be implemented via a computer or mobile device application or other suitable controller for a user to operate or view diagnostics or aspects of the energy distribution system 23 or the wall system 34.

The removability of the access panel 31 and the cover panel(s) 6 (see FIG. 3) facilitate access for testing, repair, or replacement of components of the energy distribution system 23. For example, line segments may be replaced, upgraded, and so forth, without the downsides associated with cutting and splicing wires.

FIG. 4 further illustrates removable stops 39 (which are also shown in FIG. 2). These removable stops 39 may be positioned between the vertical components and the horizontal components to provide additional routing space for other cable systems (e.g., systems other than those that include elongated conductive bars according to embodiments of the present technology). For example, in some embodiments, one or more panel assemblies 35 or the overall frame structure 100 may not include some or all of the components of embodiments of the energy distribution system 23. Rather, in some embodiments, one or more of the panel assemblies 35 or the overall frame structure 100 may accommodate conventional wiring systems, with the advantage of accessibility to the wiring systems via the removable cover panel(s) 6 (see FIG. 3) and the one or more removable access panels 31.

Figure 5:
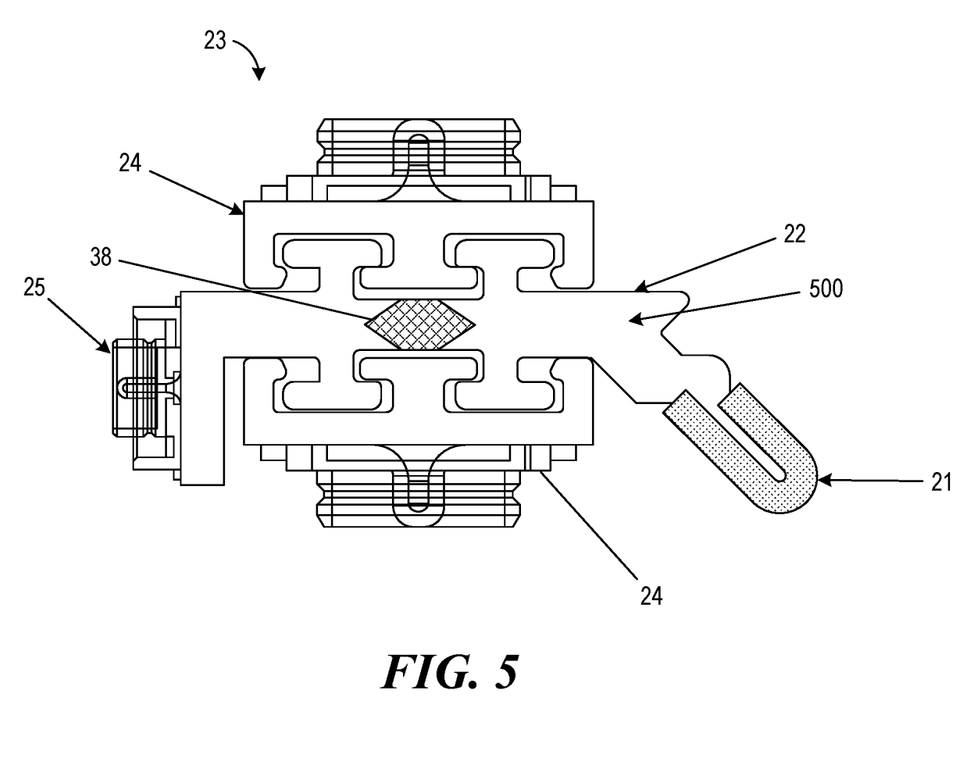
FIG. 5 illustrates a detailed partially schematic cross-sectional view of a conductive line and corresponding attachment elements, configured in accordance with embodiments of the present technology.

FIG. 5 illustrates a detailed partially schematic cross-sectional view of a portion of the energy distribution system 23, configured in accordance with embodiments of the present technology. In some embodiments, the energy distribution system 23 comprises a conductive line 500, which may be an extruded line, and which may be at least partially or entirely coated or sheathed in an insulator material 22. In some embodiments, the conductive line 500 may be apportioned such as bifurcated into two or more parallel segments using an insulator bar 38. Apportioning or bifurcating the conductive line 500 facilitates the implementation of multiple nodes such as positive, negative, or neutral nodes, or data connections.

Any suitable number of parallel segments and insulator bars 38 may be implemented in various embodiments. In some embodiments, the energy distribution system 23 may include a plurality of adjacent/parallel conductive lines 500. In a preferred embodiment, the conductive lines 500 are extruded rods or bars, and are not conventional wiring that features twisted cables sheathed together, because those conventional cables are difficult to maintain or replace, and conventionally only provide power at their terminal ends. Rather, the conductive lines 500 may be continuous rods, strips, or bars of conductive material that may be tapped into at any point. In some embodiments, rods, strips, or bars forming the conductive lines 500 (or the conductive lines 40) may be generally rigid (in contrast with conventional wiring or cables which are generally flexible).

The energy distribution system 23 may include the access elements 24, which may be attached through the horizontal frame elements 7, 15, 17 or the vertical frame element portions 29, 30 to the conductive line 500 or the conductive line 40, for example, by piercing, clamping onto, or otherwise engaging the conductive line 500 or the conductive line 40, or by piercing the insulator material 22 and the conductive line 500. A representative electrically insulative component 22 is also shown in FIG. 5. The electrically insulative component 22 may support the conductive line 500 and insulate it against a supporting portion of the beam body 300 (see FIG. 3) or other portions of the horizontal frame elements 7, 15, 17 or the vertical frame element portions 29, 30.

In some embodiments, one or more additional access elements 25 may clamp onto, pierce, or otherwise engage or attach to the conductive line 500 to provide another access point to the electricity or data therein. The access elements 24, 25 function as interfaces between the conductive line 500 and devices that use or provide electricity or data passing through the conductive line 500, such as the powered infills 36, 37 (which may be connected to the access elements 24, 25 via their own harnesses, such as "pigtails"), or any other device that may use electricity, produce electricity, or transmit signal, such as a device charging point, office equipment, a display, a photovoltaic panel, a wireless internet signal booster, an alarm system, a camera (which may receive electricity and transmit data through the distribution system 23), lights, and so forth.

The access elements 24, 25 may include one or more features for fastening to the conductive line(s) 500. For example, the access elements 24, 25 may include twisting or piercing features or other suitable features for making contact with or fixing onto the conductive line(s) 500 or portions thereof, and may include piercing features for passing through or cutting into the insulation to access the conductive line(s) 500.

In some embodiments, the access elements 24, 25 may be connected to separate channels or poles of the conductive line 500 (i.e., separate portions of the conductive line 500, as divided by the insulator bar 38, for providing different amounts or types of electricity or data), such that one access element 24 or a portion thereof may tap into a different channel than another access element 25 or another portion of the access element 24. In some embodiments, the access elements may be connected to, or may include, power regulation or inversion devices connected to photovoltaic infills to provide point-of-use voltage from the photovoltaic infills.

Figure 6:
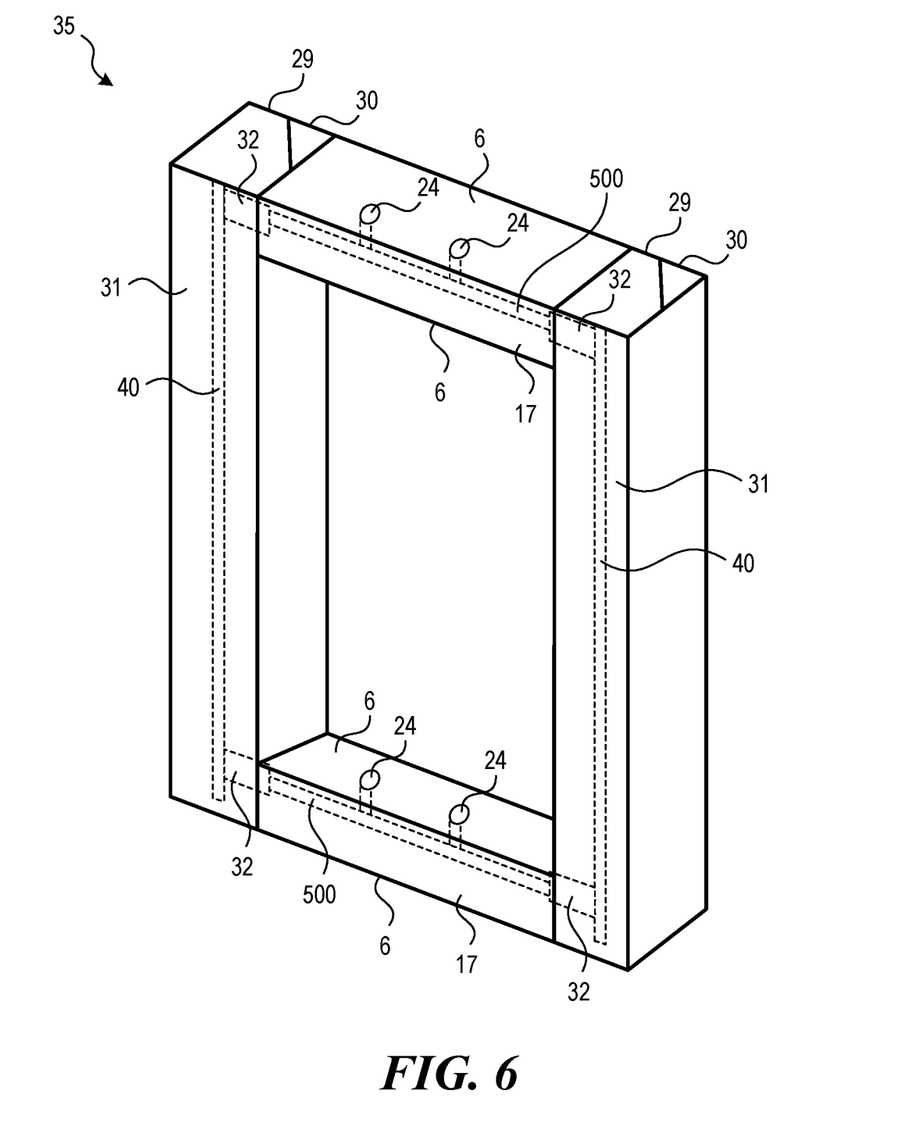
FIG. 6 illustrates a partially schematic perspective view of a panel assembly configured in accordance with embodiments of the present technology.

FIG. 6 illustrates a partially schematic perspective view of a panel assembly, such as the panel assembly 35 described above, configured in accordance with embodiments of the present technology. Visible in FIG. 6 are the vertical frame element portions 29, 30 and two access panels 31, each access panel 31 being removably attached to a corresponding pair of vertical frame element portions 29, 30; two of the horizontal frame elements 17 and the cover panels 6 removably attached to the horizontal frame elements 17; and components of the energy distribution system 23 such as the horizontal conductive lines 500, the vertical conductive lines 40, the continuity patches 32 for connecting the horizontal and vertical conductive lines 500, 40, and access elements 24 for tapping into the conductive lines 500, 40, as access to the energy or data in the conductive lines 500, 40.

With reference to FIGS. 1-4 and 6, each panel assembly 35 or horizontal frame element 7, 15, 17 may be attached to the building, with each carrying its own conductive line 500 and other aspects of the energy distribution system 23, and the conductive line 40 within the vertical frame element portions 29, 30 may be connected to the horizontal conductive line 500 via the continuity patch 32, forming an overall powered wall system 34.

In operation, a wall system 34 may be implemented around all or part of a building and may span one or more floors to form an exterior façade of the building or interior walls of the building, and to provide access points for electricity and data (via the access elements 24, 25, and so forth.) to users on the interior side of the building or otherwise positioned near the wall or façade. An advantage of embodiments of the present technology is that the access panel 31 and the cover panels 6 provide access to the energy distribution system 23 for maintenance, replacement, upgrading, and so forth, and the energy distribution system 23 does not present the difficult maintenance issues associated with conventional wiring systems. For example, the present technology provides a reduced need or eliminates the need to splice or run long lengths of cable to perform replacements (which is conventionally further complicated by having to run cable around sharp corners through hollows with little or no visibility or access).

Elements/components disclosed herein may be made with any suitable materials. For example, conductive materials may include copper, aluminum, or other suitable conductive materials. Aspects of the frame structure 100 may include aluminum, steel, or other suitable materials.

Embodiments of the present technology may include kits of parts comprising any quantity or combination of any of the components disclosed herein. For example, in some embodiments, a kit of parts may include one or more frame elements or portions thereof, one or more infills, one or more continuity patches, one or more conductive lines, and so forth.

From the foregoing, it will be appreciated that specific embodiments of the presently disclosed technology have been described herein for purposes of illustration, but that various modifications may be made without deviating from the scope of the technology. For example, the wall system may be an internal wall and it need not be an external wall or outer façade. In some embodiments, horizontal and vertical components may be made vertical and horizontal components, respectively, or any other suitable orientations may be used. In some embodiments, although the energy distribution system 23 may distribute electricity, it may additionally or alternatively include a data distribution system using the components of the energy distribution system 23 or other components (for example, a data cable may be included parallel with one or more of the conductive lines 500, or the conductive lines 500 may carry data signals or other signals or information).

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls.

What is claimed is:

1. A wall system comprising a first panel assembly and a second panel assembly, wherein:
   (a) the first panel assembly comprises:
      a first vertical frame element portion, wherein the first vertical frame element portion comprises one or more first mechanical connection devices;
      a second vertical frame element portion, wherein the second vertical frame element portion comprises one or more second mechanical connection devices; and
      a horizontal frame element;
   (b) at least one of the first vertical frame element portion of the first panel assembly or the second vertical frame element portion of the first panel assembly is connectable and engageable, via the one or more first mechanical connection devices or the one or more second mechanical connection devices, respectively, with a vertical frame element portion of the second panel assembly;
   (c) the wall system further comprises an access panel that is releasably attachable to the at least one of the first vertical frame element portion of the first panel assembly or the second vertical frame element portion of the first panel assembly, and which is releasably attachable to the vertical frame element portion of the second panel assembly, to form at least part of an enclosure;
   (d) the wall system further comprises an energy distribution system comprising an elongated conductive bar at least partially positionable within the horizontal frame element or the enclosure; and
   (e) the wall system further comprises one or more access elements positionable to engage the elongated conductive bar to receive electricity or a data signal from the elongated conductive bar.

2. The wall system of claim 1, wherein the elongated conductive bar is coated or sheathed in an insulative material.

3. The wall system of claim 1, wherein the elongated conductive bar is a first elongated conductive bar at least partially positionable within the horizontal frame element, and wherein the wall system further comprises a second elongated conductive bar at least partially positionable within the enclosure.

4. The wall system of claim 3, further comprising a continuity patch connecting the first elongated conductive bar to the second elongated conductive bar.

5. The wall system of claim 3, wherein:
(a) at least one of the one or more access elements is positionable to extend from a region outside of the horizontal frame element, and through at least a portion of the horizontal frame element, to contact the first elongated conductive bar; or
(b) at least one of the one or more access elements is positionable to extend from a region outside of the enclosure to contact the second elongated conductive bar.

6. The wall system of claim 1, wherein the first panel assembly or the second panel assembly further comprises an infill, wherein the infill comprises a photovoltaic panel or an electrochromic panel electrically connected to the energy distribution system.

7. The wall system of claim 1, wherein the horizontal frame element comprises one or more supports for supporting at least a portion of the energy distribution system within or on the horizontal frame element.

8. The wall system of claim 7, wherein the horizontal frame element comprises one or more cover panels, wherein the one or more cover panels are releasably attachable to the remainder of the horizontal frame element or openable relative to the remainder of the horizontal frame element.

9. The wall system of claim 1, wherein the wall system defines at least part of an exterior façade for a building.

10. The wall system of claim 1, wherein the elongated conductive bar comprises an insulated bar bifurcating the elongated conductive bar into parallel segments.

11. An exterior wall façade system comprising one or more panel assemblies connectable to a building, wherein the one or more panel assemblies comprises a first panel assembly and a second panel assembly, and wherein:
(a) the first panel assembly comprises:
a first vertical frame element portion, wherein the first vertical frame element portion comprises one or more first mechanical connection devices;
a second vertical frame element portion, wherein the second vertical frame element portion comprises one or more second mechanical connection devices;
a first horizontal frame element, wherein the first horizontal frame element comprises one or more supports configured to carry one or more components of an energy distribution system; and
one or more cover panels, wherein the one or more cover panels are releasably attachable to the remainder of the first horizontal frame element or openable relative to the remainder of the first horizontal frame element, and positionable to at least partially cover the one or more supports;
(b) at least one of the first vertical frame element portion of the first panel assembly or the second vertical frame element portion of the first panel assembly is connectable and engageable, via the one or more first mechanical connection devices or the one or more second mechanical connection devices, respectively, with a vertical frame element portion of the second panel assembly; and
(c) the wall façade system further comprises an access panel that is releasably attachable to the at least one of the first vertical frame element portion of the first panel assembly or the second vertical frame element portion of the first panel assembly, and which is releasably attachable to the vertical frame element portion of the second panel assembly, to form at least part of an enclosure.

12. The exterior wall façade system of claim 11, further comprising one or more elongated extruded conductive bars at least partially positionable within the enclosure.

13. The exterior wall façade system of claim 12, wherein the one or more elongated extruded conductive bars are configured to carry at least one of data or electricity, and wherein the one or more elongated extruded conductive bars are supported or supportable on the one or more supports.

14. The exterior wall façade system of claim 11, further comprising one or more elongated extruded conductive bars at least partially carried by the one or more supports.

15. An exterior façade for a building, the façade comprising a first panel assembly and a second panel assembly, wherein:
(a) the first panel assembly comprises:
a first vertical frame element portion, wherein the first vertical frame element portion comprises one or more first mechanical connection devices;
a second vertical frame element portion, wherein the second vertical frame element portion comprises one or more second mechanical connection devices; and
a horizontal frame element;
(b) at least one of the first vertical frame element portion of the first panel assembly or the second vertical frame element portion of the first panel assembly is connectable and engageable, via the one or more first mechanical connection devices or the one or more second mechanical connection devices, respectively, with a vertical frame element portion of the second panel assembly;
(c) the façade further comprises an access panel that is releasably attachable to the at least one of the first vertical frame element portion of the first panel assembly or the second vertical frame element portion of the first panel assembly, and which is releasably attachable to the vertical frame element portion of the second panel assembly, to form at least part of an enclosure;
(d) the first panel assembly comprises an infill, wherein the infill comprises at least one of a photovoltaic panel configured to generate electricity or an electrochromic panel configured to use electricity to change a characteristic of the infill; and
(e) the first panel assembly comprises a means for conducting electricity, wherein the means for conducting electricity is at least partially positioned within the enclosure.

16. The exterior façade of claim 15, wherein the first panel assembly or the second panel assembly further comprises a means for transmitting data within the enclosure.

17. The exterior façade of claim 15, wherein the means for conducting electricity comprises an elongated extruded bar at least partially supported within the enclosure.

18. The exterior façade of claim 15, further comprising one or more access points in or on the first panel assembly for connecting a device to the means for conducting electricity.

* * * * *